(12) United States Patent
Vatidis et al.

(10) Patent No.: US 11,074,110 B1
(45) Date of Patent: Jul. 27, 2021

(54) SYSTEM AND METHOD FOR RESOURCE ALLOCATION

(71) Applicant: Hubstar International Limited, London (GB)

(72) Inventors: Stefanos Vatidis, London (GB); Denis Mequinion, London (GB)

(73) Assignee: Hubstar International Limited, London (GB)

( * ) Notice: Subject to any disclaimer, the term of this patent is extended or adjusted under 35 U.S.C. 154(b) by 0 days.

(21) Appl. No.: 17/015,383

(22) Filed: Sep. 9, 2020

Related U.S. Application Data

(63) Continuation of application No. 16/943,702, filed on Jul. 30, 2020.

(51) Int. Cl.
*G06F 9/46* (2006.01)
*G06F 9/50* (2006.01)

(52) U.S. Cl.
CPC .................. *G06F 9/5038* (2013.01)

(58) Field of Classification Search
None
See application file for complete search history.

(56) References Cited

U.S. PATENT DOCUMENTS

| | | | |
|---|---|---|---|
| 5,124,912 A | 6/1992 | Hotaling et al. | |
| 5,325,525 A * | 6/1994 | Shan | G06F 9/52 712/28 |
| 7,343,313 B2 | 3/2008 | Dorenbosch et al. | |
| 7,912,745 B2 | 3/2011 | Mansour | |
| 8,244,568 B2 | 8/2012 | Baron et al. | |
| 8,346,589 B1 | 1/2013 | Norton et al. | |
| 8,718,254 B2 | 5/2014 | Yasrebi et al. | |
| 9,081,627 B1 | 7/2015 | Blanding et al. | |

(Continued)

FOREIGN PATENT DOCUMENTS

| | | |
|---|---|---|
| EP | 0276424 | 8/1988 |
| EP | 0276426 | 8/1988 |

(Continued)

OTHER PUBLICATIONS

Russell et al., "Managing Project Value Budgets and Costs," Technical Project Management in Living and Genometric Order, Third Edition, 2018—399 pages.

*Primary Examiner* — Camquy Truong
(74) *Attorney, Agent, or Firm* — Dority & Manning, P.A.

(57) ABSTRACT

A computer-implemented method for scheduling a series of recurring events including: receiving one or more requests to allocate resource(s) to a series of recurring events, wherein the one or more requests specify, for each event, a corresponding desired time period over which the resource(s) are to be allocated, and the one or more requests further specify one or more adjustment criteria for defining, for one or more of the events, one or more permissibly adjusted time periods from the desired time period; obtaining, for each event, resource availability data indicative of an availability of the resource(s) during the desired time period; and, for each event: determining, based on the resource availability data, a viable time period, wherein the viable time period is either the desired time period or a permissibly adjusted time period that satisfies the one or more adjustment criteria; and allocating the resource(s) to the viable time period.

19 Claims, 5 Drawing Sheets

(56) References Cited

U.S. PATENT DOCUMENTS

| | | |
|---|---|---|
| 9,578,080 B1 | 2/2017 | Vermeulen et al. |
| 9,626,659 B2 | 4/2017 | Bathiya |
| 9,986,580 B2 | 5/2018 | Leung et al. |
| 2002/0174185 A1 | 11/2002 | Rawat et al. |
| 2003/0028582 A1* | 2/2003 | Kosanovic ............... G06F 9/505 |
| | | 718/105 |
| 2003/0149606 A1 | 8/2003 | Cragun et al. |
| 2004/0064355 A1 | 4/2004 | Dorenbosch et al. |
| 2004/0088362 A1 | 5/2004 | Curbow et al. |
| 2005/0022251 A1 | 1/2005 | Ohnuma et al. |
| 2005/0102245 A1 | 5/2005 | Edlund et al. |
| 2006/0036759 A1* | 2/2006 | Shen ................... H04L 65/4076 |
| | | 709/234 |
| 2006/0253472 A1 | 11/2006 | Wasserman et al. |
| 2006/0293943 A1 | 12/2006 | Tischhauser et al. |
| 2007/0143168 A1 | 6/2007 | Plas |
| 2007/0239507 A1 | 10/2007 | Madhogarhia |
| 2009/0018878 A1 | 1/2009 | Baron et al. |
| 2009/0083105 A1 | 3/2009 | Bhogal et al. |
| 2009/0083112 A1 | 3/2009 | Bhogal et al. |
| 2009/0228321 A1 | 9/2009 | Srinivasan et al. |
| 2010/0121665 A1 | 5/2010 | Boyer |
| 2010/0146058 A1 | 6/2010 | Naef |
| 2012/0005261 A1 | 1/2012 | Pandey et al. |
| 2012/0278129 A1* | 11/2012 | Salomatin .......... G06Q 30/0241 |
| | | 705/7.31 |
| 2013/0179211 A1 | 7/2013 | Murphy, Jr. et al. |
| 2014/0237041 A1 | 8/2014 | Bhat et al. |
| 2015/0142493 A1 | 5/2015 | Lakritz et al. |
| 2015/0169371 A1 | 6/2015 | Yarvis et al. |
| 2015/0193739 A1 | 7/2015 | Min et al. |
| 2016/0078410 A1 | 3/2016 | Horton |
| 2016/0180259 A1 | 6/2016 | Marianko et al. |
| 2016/0217432 A1 | 7/2016 | Yavor et al. |
| 2016/0239808 A1 | 8/2016 | Ryu |
| 2017/0140340 A1 | 5/2017 | Chattopadhyay et al. |
| 2018/0089634 A1 | 3/2018 | Cannons et al. |
| 2018/0107987 A1 | 4/2018 | MacKenzie et al. |
| 2018/0189743 A1 | 7/2018 | Balasubramanian et al. |
| 2019/0019127 A1 | 1/2019 | Anderson et al. |
| 2019/0043021 A1 | 2/2019 | Yavor et al. |
| 2019/0159256 A1 | 5/2019 | Talarico et al. |
| 2019/0295020 A1 | 9/2019 | Gupta et al. |
| 2019/0333024 A1 | 10/2019 | Adamson et al. |
| 2020/0258051 A1 | 8/2020 | Ma |

FOREIGN PATENT DOCUMENTS

| | | |
|---|---|---|
| EP | 0276429 | 8/1988 |
| WO | WO 2015/102843 | 7/2015 |
| WO | WO 2018/071277 | 4/2018 |

* cited by examiner

200

Receive a Request to Allocate One or More Resources to
a Recurring Series of Events, wherein the Request Specifies, for each Event,
a Corresponding Desired Time Period and One or More Adjustment Criteria for
Defining One or More Permissibly Adjusted Time Periods
210

Obtain, for each Event, Resource Availability Data Indicative of
an Availability of the One or More Resources During the Desired Time Period
220

Obtain, for at least One Event, Resource Importance Data Indicative of
a Relative Importance of the One or More Resources
and One or More Unavailable Resources
230

Obtain, for at least One Event, Expected Location Data Indicative of an
Expected Location of at Least a Portion of the
One or More Resources During the Desired Time Period
240

Obtain, for at least One Event, Preference Data Indicative of
One or More Time Period Preferences of at Least a Portion of the
One or More Resources During the Desired Time Period
250

For Each Event:

Determine, based on the Resource Availability Data, a Viable Time
Period which is Either the Desired Time Period or a Permissibly Adjusted
Time Period that Satisfies the one or more Adjustment Criteria
260

Allocate the One or More Resources to the Viable Time Period
270

Determine, based on the Resource Availability Data, that at Least One of the One or More Resources are Unavailable at the Desired Time Period
310

↓

Determine the One or More Permissibly Adjusted Time Periods In Response to the Determination
320

↓

Setting the Viable Time Period to be One of the One or More Permissibly Adjusted Time Periods
330

Determine, that the at Least One of the One or More Resources are Available at the One of the One or More Permissibly Adjusted Time Periods
332

Determine that the at Least One of the One or More Resources is of Greater Importance than One or More Unavailable Resource
334

260-B

Provide, to One or More Persons, One or More Permissibly Adjusted Time Period Options
340

Sending, to One or More Computing Devices of the One or More Persons, the One or More Permissibly Adjusted Time Period Options
342

↓

Receive One or More Indications of One or More Preferred Time Periods, wherein the Indications are based on Input(s) by at Least One of the One or More Persons
350

↓

Determining the Viable Time Period based on the Received One or More Indications of the One or More Preferred Time Periods
360

Obtain, for at Least One Event of the Series of Recurring Events, Updated Resource Availability Data Indicative of an Updated Availability of the One or More Resources During the Viable Time Period
410

Determine, based on the Updated Resource Availability Data, an Updated Viable Time Period for the at Least One Event
420

Determine, based on the Updated Resource Availability Data, that at Least One of the One or More Resources are Unavailable at the Viable Time Period
422

Determine that the at Least One of the One or More Resources is Available at One or More Other Time Periods, Wherein Each of the One or More Other Time Periods is the Desired Time Period or a Permissibly Adjusted Time Period
424

Setting the Updated Viable Time Period to be One of the One or More Other Time Periods
426

Allocate the One or More Resources, for the at Least One Event, to the Updated Viable Time Period
430

FIG. 4

SYSTEM AND METHOD FOR RESOURCE ALLOCATION

TECHNICAL FIELD

The present disclosure relates to systems and methods for allocating resources to time periods. In particular, but without limitation, this disclosure relates to systems and method for allocating resources to a series of recurring events.

BACKGROUND

Resource-allocation systems facilitate the allocation of resources at various time periods. Many resources are allocated on a recurring basis to a series of recurring events, e.g. a given resource may be allocated to an event occurring every week at a particular time and date. For example, a confluence (e.g. a meeting) may occur or at regular intervals and resources for that confluence accordingly allocated at the regular intervals. However, existing resource allocation systems have significant limitations in handling series of recurring events. These existing systems determine time periods for the events without taking into account factors that could render at least some of these time periods unviable. By determining unviable time periods, these systems result in events being scheduled at unviable times necessitating rescheduling of these events.

SUMMARY

Aspects described herein improve scheduling of a series of recurring events by utilizing data relating to the availability of resources to be utilized for instances of the series of recurring events. These improvements result in the prevention of and/or reduction in instances of the series of recurring events being scheduled at unviable time periods, e.g. time periods where resources needed for the event are unavailable. This reduction in the scheduling of events at unviable time periods results in fewer reschedulings and/or impromptu cancellations of events. In a computer-implemented resource-allocation system, communicating reschedulings and impromptu cancellations of events consumes network bandwidth and computational resources. Thus, reducing these reduces the network bandwidth and computational resources consumed by a computer-implemented resource-allocation system.

According to a first aspect, there is provided a computer-implemented method for scheduling a series of recurring events. The method includes: receiving one or more requests to allocate one or more resources to a series of recurring events, wherein the one or more requests specify, for each event, a corresponding desired time period over which the one or more resources are to be allocated, and the one or more requests further specify one or more adjustment criteria for defining, for one or more of the events, one or more permissibly adjusted time periods from the desired time period; obtaining, for each event, resource availability data indicative of an availability of the one or more resources during the desired time period; and for each event: determining, based on the resource availability data, a viable time period, wherein the viable time period is either the desired time period or a permissibly adjusted time period that satisfies the one or more adjustment criteria; and allocating the one or more resources to the viable time period.

Allocating resources to each event of a series of recurring events by allocating resources to a respective viable time period that is determined based on resource availability data increases the likelihood that appropriate resource(s) are available for each event. This prevents or at least reduces events being scheduled at unviable time periods, e.g. time periods where resources needed for the event are unavailable. This prevention or at least reduction in the scheduling of events at unviable time periods results in fewer reschedulings and/or impromptu cancellations of events. As communicating reschedulings and impromptu cancellations of events consumes network bandwidth and computational resources, the consumption of network bandwidth and computational resource are correspondingly reduced.

The provided method may include receiving a request to allocate one or more resources to a first event, wherein the request specifies a time interval within which the one or more resources are to be allocated; obtaining first resource availability data indicative of an availability of the one or more resources during the time interval; determining, based on the first resource availability data, a first time period for the first event; and allocating the one or more resources to the first time period.

Allocating resources to a first event by allocating resources to a first time period determined based on resource availability data increases the likelihood that appropriate resource(s) are available for the further event. This prevents or at least reduces the likelihood of the first event being scheduled at an unviable time period, e.g. time periods where resources needed for the first event are unavailable. This may reduce network bandwidth and computational resource consumption for the reasons given above. Furthermore, specifying that the first time period is within a first time interval, rather than constraining the first time period more tightly, e.g., by specifying that the first time period must be one of one or more time periods, reduces the likelihood that it will not be possible to determine a suitable first time period. This may prevent or at least reduce the likelihood that an additional modified request needs to be made in order to successfully allocate resources to the first event. Sending, receiving and processing such additional modified requests consumes computational resources and network bandwidth. Hence, by preventing or at reducing the likelihood that such additional modified requests are made, computational resource and network bandwidth consumption are correspondingly reduced.

At least one of the desired time periods may be based on the first time period.

Basing at least one of the desired time periods on the first time period may increase the predictability of the at least one of the desired time periods and, consequently, the predictability of the corresponding at least one of the viable time periods. Increasing the predictably of the at least one of the viable time periods increases the memorability of the at least one of the viable time periods reducing the likelihood of impromptu cancellations, and correspondingly reducing computational resource and network bandwidth consumption associated therewith.

For at least one event of the series of recurring events, determining the viable time period may include: determining, based on the resource availability data, that at least one of the one or more resources is unavailable at the desired time period; in response to determining that the at least one of the one or more resources is unavailable at the desired time period, determining the one or more permissibly adjusted time periods from the one or more adjustment criteria; and setting the viable time period to be one of the one or more permissibly adjusted time periods.

Determining the viable time period to be one of one or more permissibly adjusted time periods where at least one of the one or more resources is unavailable at the desired time period prevents the one or more resources from being allocated to the desired time period where at least one of the one or more resources are unavailable at the desired time period. If the one or more resources were to be allocated to the desired time period, this would require an impromptu cancellation or rescheduling which consumes computational resources and network bandwidth. Thus, preventing this reduces computational resource and network bandwidth consumption.

Setting the viable time period to be the one of the one permissibly adjusted time periods may include determining, based on the resource availability data, that the at least one of the one or more resources are available at the one of the one or more permissibly adjusted time periods.

Determining that the at least one of the one or more resources are available at the one of the one or more permissibly adjusted time periods at which the one or more resources are to be allocated prevents or at least reduces the likelihood that rescheduling or impromptu cancellation will be required because of an unavailability of the at least one of the one or more resources. As rescheduling and impromptu cancellation consume network bandwidth and computational resources, network bandwidth and computational resource consumption are correspondingly reduced.

The one or more requests may include a request to allocate a desired plurality of resources including the one or more resources and one or more unavailable resources.

The provided method may include obtaining resource importance data indicative of a relative importance of the at least one of the one or more resources and the one or more unavailable resources. Setting the viable time period may include determining, based on the resource importance data, that the at least one of the one or more resources is of greater importance than the one or more unavailable resources.

Setting the viable time period based on the at least one of the one or more resources being of greater importance than the one or more unavailable resources may facilitate allocation of the one or more resources to time periods in circumstances where not all of the desired plurality of resources are available but at least one of the one or more resources of greater importance, e.g. required resources, are available. This may facilitate scheduling of events in circumstances where there is no viable time period at which all of the one or more resources are available. Without such functionality, additional modified requests may need to be made in order to find a time period at which the at least one of the resources of greater importance are available. For example, a user would otherwise manually make further requests removing resources from the request which they consider to be less important. As making each of these additional modified requests consumes network bandwidth and computational resources, by avoiding these, computational bandwidth and network resource usage may be correspondingly reduced.

The one or more requests may include one or more repetition objectives for specifying the corresponding desired time period for each event.

The one or more repetition objectives may include one or more of a recurrence definition, a periodicity definition, a day reference definition and/or a named day definition.

Utilizing repetition objectives, e.g. of the types described, increase maintainability of systems implementing the provided method by providing a precise but flexible mechanism by which the desired time periods may be defined.

The one or more adjustment criteria may include one or more of a time range: a date range; a time flexibility parameter; a date flexibility parameter; a plurality of time alternatives; and/or a plurality of date alternatives.

Utilizing one or more of the specified adjustment criteria increase maintainability of systems implementing the provided method by facilitating easier and more precise specification of often desired adjustment criteria.

The one or more adjustment criteria may include one or more adjustment constraints specifying limitations to the permissible adjustments to the desired time period.

The one or more adjustment constraints may include one or more exclusion indicators specifying one or more time periods excluded from the one or more permissibly adjusted time periods and/or a repetition restriction specifying a minimum time interval between the one or more permissibly adjusted time periods and a previous viable time period.

Specifying limitations the permissible adjustments to the desired time period, e.g. using one or more exclusion indicators, may prevent or at least reduce the likelihood that the one or more resources are allocated to a time period that is unwanted or undesired. This reduces the likelihood of reschedulings or impromptu cancellations being required. As these consume network bandwidth and computational resources, network bandwidth and computational resource consumption are reduced.

The one or more resources may include one or more persons.

Due to their mobile nature and unpredictable schedules, persons are a type of resource that are particularly difficult to allocate to time periods. Thus, the benefits of the provided method may be particularly pronounced for allocating one or more persons.

The one or more resources may include one or more locations for at least one event of the series of recurring events.

The availability of locations, such as meeting rooms, is often dependent on persons' schedules, so, as a result of their unpredictable schedules, may itself be unpredictable. Thus, the benefits of the provided method may be particularly pronounced for allocation one or more locations.

For at least one event of the series of recurring events, determining the viable time period may include: providing, to the one or more persons, one or more permissibly adjusted time period options; receiving one or more indications of one or more preferred time periods, wherein the one or more indications are based on one or more inputs by at least one of the one or more persons in response to the provision of the one or more permissibly adjusted time period options; and determining the viable time period based on the received one or more indications of the one or more preferred time periods.

Providing the one or more permissibly adjusted time period options to the one or more persons may include sending, to one or more computing devices of the one or more persons, the one or more permissibly adjusted time period options.

The one or more permissibly adjusted time period options may include the viable time period. The at least one of the one or more inputs may include a selection of the viable time period.

Determining the viable time period based on indications based on one or more inputs by at least one of the one or more person may reduce the likelihood that the at least one of the one or more person is, in fact, unavailable at the supposedly viable time period, despite this not being indicated by the resource availability data. This reduces the likelihood of reschedulings and impromptu cancellations and, as these consume network bandwidth and computational resources, network bandwidth and computational resource consumption are reduced.

The provided method may include, for at least one event of the series of recurring events: obtaining preference data indicative of one or more time period preferences of at least one of the one or more persons. The determination of the viable time period for the at least one event may be based on the preference data.

Utilizing preference data for the determination of the viable time period may reduce the likelihood that at least one of the one or more persons become unavailable after the initial allocation of the at least one of the one or more persons to the viable time period. This reduces the likelihood that reschedulings and impromptu cancellations are required. As these consume network bandwidth and computational resources, network bandwidth and computational resource consumption are reduced.

The series of recurring events may be a series of recurring confluences.

Confluences involve persons, who are known to have unpredictable schedules, meaning that recurring confluences are particularly difficult to schedule. Therefore, the benefits of the provided method may be particularly pronounced when used for scheduling confluences.

The provided method may include obtaining, for at least one event of the series of recurring events, updated resource availability data indicative of an updated availability of the one or more resources during the viable time period; determining, based on the updated resource availability data, an updated viable time period for the at least one event, wherein the updated viable time period is either the desired time period or a permissibly adjusted time period; and allocating the one or more resources, for the at least one event, to the updated viable time period.

Determining the updated viable time period may include: determining, based on the updated resource availability data, that at least one of the one or more resources is unavailable at the previous viable time period; in response to determining that the at least one of the one or more resources is unavailable at the viable time period, determining, based on the updated resource availability data, that the at least one of the one or more resources is available at one or more other time periods, wherein each of the one or more other time periods is the desired time period or a permissibly adjusted time period; and setting the updated viable time period to be one of the one or more other time periods.

Utilizing updated resource availability data to update the viable time period for at least one event increases the likelihood that appropriate resource(s) are available for the at least one event at the updated viable time period. This prevents or at least reduces the likelihood that the resources needed for the at least one event are unavailable at the updated viable time period. This reduces the likelihood that impromptu cancellations or further reschedulings will be required. As impromptu cancellations and further reschedulings consume computational resources and network bandwidth, by reducing these, computational resource and network bandwidth consumption are reduced.

According to a second aspect, a computing system is provided including one or more computing devices. The one or more computing devices include one or more processors configured to: receive one or more requests to allocate one or more resources to a series of recurring events, wherein the one or more requests specify, for each event, a corresponding desired time period over which the one or more resources are to be allocated, and the one or more requests further specify one or more adjustment criteria for defining, for one or more of the events, one or more permissibly adjusted time periods from the desired time period; obtain, for each event, resource availability data indicative of an availability of the one or more resources during the desired time period; and for each event: determine, based on the resource availability data, a viable time period, wherein the viable time period is either the desired time period or a permissibly adjusted time period that satisfies the one or more adjustment criteria; and allocate the one or more resources to the viable time period.

According to a third aspect, a non-transitory computer-readable medium is provided. The non-transitory computer-readable medium includes instructions that, when executed by a processor, cause the processor to: receive one or more requests to allocate one or more resources to a series of recurring events, wherein the one or more requests specify, for each event, a corresponding desired time period over which the one or more resources are to be allocated, and the one or more requests further specify one or more adjustment criteria for defining, for one or more of the events, one or more permissibly adjusted time periods from the desired time period; obtain, for each event, resource availability data indicative of an availability of the one or more resources during the desired time period; and for each event: determine, based on the resource availability data, a viable time period, wherein the viable time period is either the desired time period or a permissibly adjusted time period that satisfies the one or more adjustment criteria; and allocate the one or more resources to the viable time period.

BRIEF DESCRIPTION OF THE DRAWINGS

Arrangements of the present invention will be understood and appreciated more fully from the following detailed description, made by way of example only and taken in conjunction with drawings in which:

FIG. 2 shows a method for scheduling a series of recurring events according to an embodiment;

FIG. 3 shows methods for determining a viable time period for one or more events according to embodiments;

FIG. 4 shows a method for updating one or more time periods based on updated resource availability data according to an embodiment.

DETAILED DESCRIPTION

The embodiments described herein aim to improve scheduling of a series of recurring events by utilizing data relating to the availability of resources to be utilized for instances of the series of recurring events. These improvements result in the prevention of and/or reduction in instances of the series of recurring events being scheduled at unviable time periods, e.g. time periods where resources needed for the event are unavailable. This reduction in the scheduling of events at unviable time periods results in fewer reschedulings and/or impromptu cancellations of events. In a computer-implemented resource-allocation system, communicating reschedulings and impromptu cancellations of events consumes network bandwidth and computational resources. Thus, reducing these reduces the network bandwidth and computational resources consumed by a computer-implemented resource-allocation system.

Resource Allocation System

Figure 1:
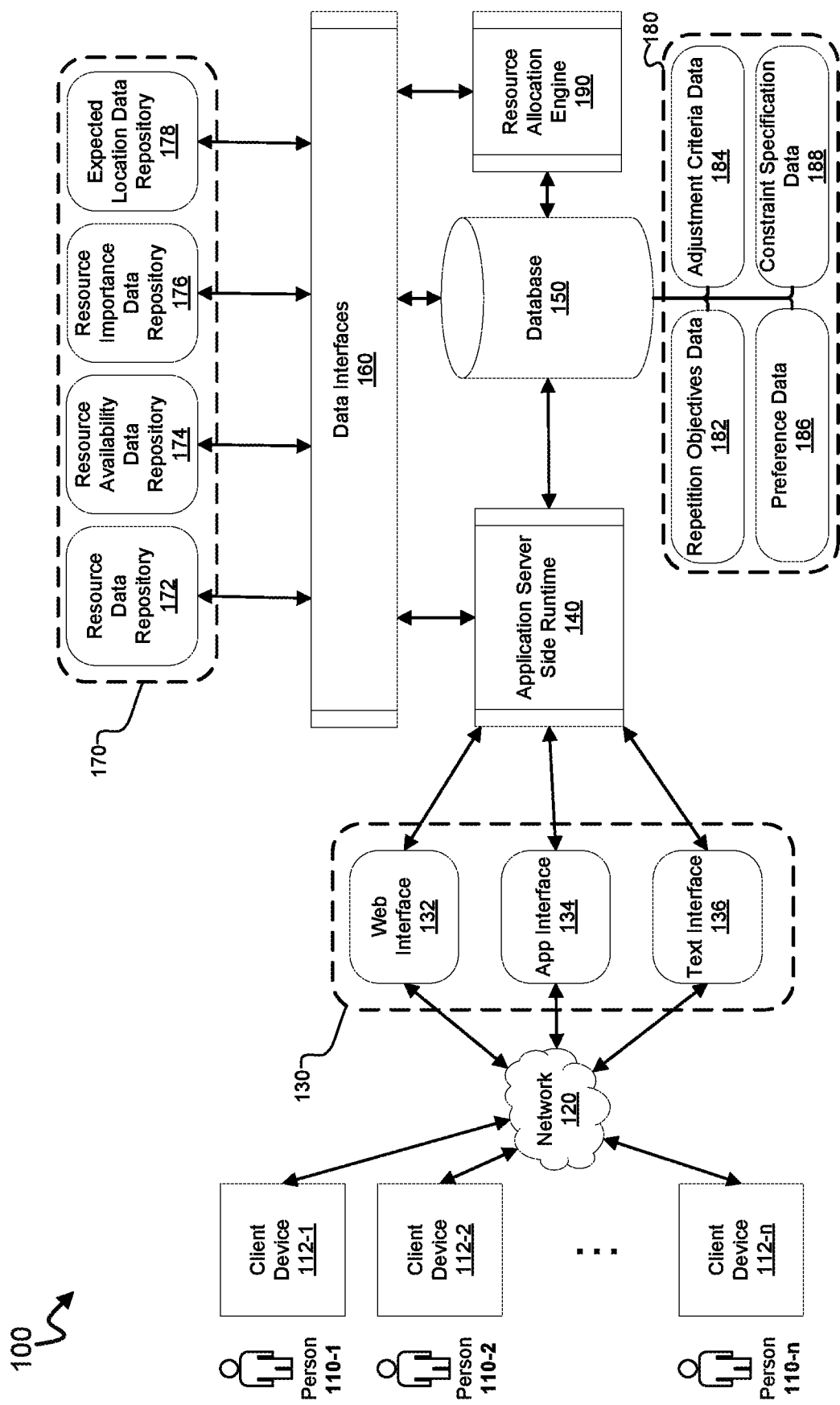
FIG. 1 shows a schematic detailing a computer system for allocating resources to a series of recurring events in accordance with an embodiment.

FIG. 1 shows a schematic detailing a computer system 100 for allocating resources to a series of recurring events in accordance with an embodiment. The computer system 100 is configured to allocate resources for instances of the series of recurring events based on resource availability data.

The computer system 100 includes client devices 112 used by respective persons 110. The client devices 112 may be any suitable computing devices, e.g. smartphones, tablet computers, laptop computers, desktop computers, feature phones, and/or any other computing device configured to communicate with network 120.

At least one of the client devices 112 may be utilizable by a respective person 110 to request the allocation of resources to a series of recurring events. The request may be sent by the client device 112 via the network 120. The request may be sent using any suitable mechanism and/or in any suitable form, e.g. as an application programming interface (API) call, a web service request (e.g. a representational state transfer (REST) request), an email or a messaging service message. The respective person 110 may input the request through one or more applications using which the request may be sent, e.g. a web browser application shown a request input web page, a messaging application through which resource request messages may be sent, and/or a native application through which requests may be sent.

The request may specify one or more resources that are required for each of or each of a subset of the series of recurring events, and may also specify one or more resources that are desired for each of or each of a subset of the series of recurring events. The request may specify, for each event of the series of recurring events, a corresponding desired time period at which to allocate the one or more required resources and, if possible, at least some of the desired one or more resources.

A first time period for a first event in the series may be within a given interval but need not have a specified start and/or end time. Alternatively, the desired start and end of the desired time period may be specified, (e.g. a request to allocate resources for 10 am to 11 am on Thursday 19 Jun. 2020). One or more of the corresponding desired time periods for the subsequent events in the series of recurring may be based on the first time period and/or defined relative to the first time period rather than being explicitly defined in the request.

The corresponding desired time periods for each of the series of recurring events may be specified by one or more repetition objectives, which may specify the pattern of the desired time periods and/or the relationship between each of the desired time periods. In addition, the request may specify one or more adjustment criteria, which define one or more permissibly adjusted time periods for each of the desired time periods.

The repetition objectives may include, but are not limited to, one or more of a recurrence definition, a periodicity, definition, a day reference definition and/or a named day definition. A recurrence definition may specify that the desired time period should recur at a given time period frequency, e.g. daily, weekly or monthly. A periodicity definition may specify that the desired time period should recur at given intervals, e.g. every X days, Y weeks or Z months, where X, Y and Z are positive integers. A day reference definition may specify that the desired time period should recur one or more given numbered days or working days relative to the start or end of an interval, e.g. a month or a year. For example, a day reference definition may specify that the desired time period should recur on: the $5^{th}$ day of the month; the $2^{nd}$ last working day of the month; or the $5^{th}$ last working day of the year. The day reference definition may specify that the desired time period should recur on a plurality of numbered days or working days. For example, a day reference definition may specify that the desired time period should recur on the $4^{th}$ day of the month, the $15^{th}$ day of the month and the $2^{th}$ last day of the month. A named day definition may specify that the desired time period should recur on a given named day of the week, e.g. on a Monday or on a Friday. A plurality of repetition objectives may be combined. For example, a day reference definition and a named day definition may be combined to define a combined repetition objective indicating that the event should occur on a named day closest to the numbered day, e.g. that the desired time period should recur on the Tuesday closest to the $6^{th}$ day of the month.

The adjustment criteria define rules for setting an alternative time period to the desired time period. Generally, the system will aim to set a viable time period that has the same length as the desired time period and that maximizes the amount of resources that can be allocated to the event whilst still satisfying the adjustment criteria. For instance, when scheduling a series of confluences, each instance will be adjusted based on the adjustment criteria to maximize the number of attendees.

The adjustment criteria may include, but are not limited to, one or more of a time range; a date range; a time flexibility parameter; a date flexibility parameter; one or more time alternatives; and/or one or more alternatives.

A time range defines a start time and end time within which the time period can be permissibly adjusted. For example, the desired time period may be 10 am-11 am, the time range may be 10 am-3 pm, and the permissibly adjusted time period may be any one hour time period within this range.

A date range defines a start date and end date within which the date of the time period can be permissibly adjusted. For example, the desired time period may be 10 am-11 am on $5^{th}$ May, the date range may be $3^{rd}$ May-$7^{th}$ May, and the permissibly adjusted time period may be 10 am-11 am on any of the $3^{rd}$, $4^{th}$, $6^{th}$, or $7^{th}$ May.

A time flexibility parameter defines an amount of time by which the desired time period may be adjusted. For example, the desired time period may be 1 pm-1:30 pm, the time flexibility parameter may be 1.5 hours, and the permissibly adjusted time periods may be an adjustment of the desired time period by up to an hour and a half, e.g. any 30 minute time period starting at a time between 11:30 am and 2:00 pm.

A date flexibility parameter defines a number of days or working days by which the date of the desired time period may be adjusted. For example, the desired time period may be 3 pm-4 pm on $15^{th}$ July, the date flexibility parameter may be 2 days, and the permissibly adjusted time period may be 3 pm-4 pm on any of the $13^{th}$, $14^{th}$, $16^{th}$ or $17^{th}$ July. As another example, the desired time period may be 1 pm-3 pm on Friday $19^{th}$ June 2020, the date flexibility parameter may be 2 working days, and the permissibly adjusted time period may be 1 pm-3 pm on any of 17, 18, 22 or 23 Jun. 2020, as the 20 and 21 Jun. 2020 are non-working days.

One or more time alternatives define one or more different time periods to which the time period may be permissibly adjusted. For example, the desired time period may be 1 pm-2 pm, the one or more time alternatives may be 9 am-10 am and 5 pm-6 pm, and the permissibly adjusted time period may be either of these times.

One or more date alternatives define one or more different date to which the date of the desired time period may be permissibly adjusted. For example, the desired time period may be 8 am-9 am on $16^{th}$ September, the one or more date alternatives may be $11^{th}$ September, and the permissibly adjusted time period may be 8 am-9 am on $11^{th}$ September.

A plurality of adjustment criteria may be combined. For example, a date range and a time flexibility parameter may be combined. As an example, the desired time period may be 4 pm-5 pm on $3^{rd}$ October, the date range may be $1^{st}$-$4^{th}$ October, and the time flexibility parameter may be two hours. Therefore, the permissibly adjusted time period may be any one hour time period starting between 2 pm and 6 pm on any of the $1^{st}$, $2^{nd}3^{rd}$ or $4^{th}$ October other than the desired time period.

The adjustment criteria may include one or more adjustment constraints specifying limitations to the permissible adjustments to the desired time period. For example, the adjustment criteria may also include one or more other adjustment criteria defining a broad range of times and/or dates to which the time period may be permissibly adjusted, but there are exceptions to this broad range which are defined by the adjustment constraints.

The adjustment constraints may include, but are not limited to, one or more of an exclusion indicator and/or a repetition restriction.

An exclusion indicator specifies one or more time periods excluded from the one or more permissibly adjusted time periods. An exclusion indicator may be a time exclusion range; or a date exclusion range. A time exclusion range specifies one or more time intervals within which a permissibly adjusted time period cannot fall, e.g. the desired time period may be an hour long, and a time exclusion range may be 12:30 pm to 1:30 pm so the time period cannot be permissibly adjusted to any time period which falls even partly within this range, e.g. the time period cannot be permissibly adjusted to 1:15 pm to 2:15 pm. A date exclusion range specifies particular dates which the time period cannot be permissibly adjusted to fall on, e.g. another adjustment criteria may be a date range covering December $1^{st}$-$31^{st}$ and the date exclusion range may exclude a range of dates within this period corresponding to public holidays, e.g. $25^{th}$-$26^{th}$ December.

A repetition restriction specifies a minimum time interval between the one or more permissibly adjusted time periods and a previous time period at which an instance of the event has occurred or is scheduled to occur. For example, a date range or date flexibility parameter adjustment criteria may indicate that the time period may be permissibly adjusted to any working day of a given week, but the repetition restriction may exclude dates which are less than a week from the previous time period at which an instance of the event has occurred or is scheduled to occur.

One or more of the client device(s) 112 may include one or more applications configured to receive one or more permissibly adjusted time period options via the network 120, presenting these one or more permissibly adjusted time period options to the respective person 110, and, in response to presenting these permissibly adjusted time period options, send one or more indications of time periods preferred by the person via the network 120. These one or more applications may include a messaging or email application displaying a received message or email including the one or more permissibly time period options and providing functionality to reply to the message with a message indicating the one or more preferred time periods. These one or more applications may include a web browser application showing received web content that includes the one or more permissibly adjusted time period options and web user interface elements for inputting the one or more preferred time periods. These one or more applications may include a native application (e.g. an app) presenting the permissibly adjusted time period options, which may have been received using a web service, and user interaction aspects for indicating the one or more preferred time periods. The presentation of the one or more permissibly adjusted time period options may be visual, e.g. displaying the one or more permissibly adjusted time period options on a display integral to or connected to the respective client device 112, or may be audible, e.g. audio output including a synthesized voice speaking the one or more permissibly time period options. The indication of the one or more preferred time periods may be a selection of one or more of the permissibly adjusted time period options or may be an indication of another one or more preferred time periods. The another one or more preferred time periods may be another one or more permissibly adjusted time periods which were not included in the one or more permissibly adjusted time period options or may be a time period that is not a permissibly adjusted time period. Where the another one or more time periods are not permissibly adjusted time periods, the client application may provide feedback to the person indicating this.

The computer system includes the network 120 to which the client devices 112 are connected. The network 120 may be any suitable network over which data may be communicated. For example, the network 120 may be any interface over which data may be transferred from the one or more applications to one or more interfaces 130.

For example, the network 120 may be any of or any combination of a local area network (LAN), a wireless local area network (WLAN), a wide area network (WAN), a cellular network (e.g. a GSM, 3G, 4G, 5G or CDMA network), an Intranet or the Internet.

The computer system 100 also includes the one or more interfaces 130. The one or more interfaces 130 are configured to act as gateways between messages and/or requests received from the client devices 112, over the network 120, and an application server side runtime 140. The one or more interfaces 130 may be one or more computer programs implemented on a single computing device or over a plurality of computing devices. For example, each of the one or more interfaces may be implemented as individual computer programs and each of the individual computer programs may be hosted on a different computing device, or the one or more interfaces may be implemented as a single computer program hosted on a single computing device. The one or more interfaces may also be separate to, but in communication with, the application server side runtime 140 or may be components of the application server side runtime 140.

The one or more interfaces may include a web interface 132. The web interface may provide functionality of the application server side runtime 140 to the client devices via one or more web pages and/or as a web application. The web interface 132 may receive one or more web protocol requests (e.g. HTTP requests) from a browser application on one of the client devices 112 indicating a request to allocate resources to a series of recurring events. In response to these web protocol requests, the web interface 132 may input this resource-allocation request or a transformation thereof to the application server side runtime 140. In response to the resource-allocation request or the transformation thereof, the application server side runtime 140 may send one or more messages indicative of permissibly adjusted time period options to the web interface 132. Then, the web interface 132 may send web content (e.g. HTML content) and/or web data (e.g. REST data) including these permissibly adjusted time period options to one or more of the client devices 112. The web interface 132 may receive one or more web protocol messages (e.g. HTTP messages) from at least one of the one or more of the client devices 112 indicating one or more preferred time periods, which may be a selection of one or of the one or more permissibly adjusted time period options, and the web interface 132 may input this indication to the application server side runtime 140. Further resource-allocation functionality of the application server side runtime 140 may be provided to the client devices via the web interface 132 using similar mechanisms.

The one or more interfaces 130 may include an app interface 134. The app interface 134 may provide functionality of the application server side runtime 140 to the client devices 112 via one or more services utilisable by native application(s) on the client devices 112. The app interface 134 may receive one or more service requests (e.g. application programming interface (API) requests, representational state transfer (REST) API requests, or Simple Object Access Protocol (SOAP) requests) from a native application on one of the client devices indicating a request to allocate resources to a series of recurring events. In response to these service requests, the app interface 134 may input this resource-allocation request or a transformation thereof to the application server side runtime 140. In response to the resource-allocation request or the transformation thereof, the application server side runtime 140 may send one or more messages indicative of one or more permissibly adjusted time period options to the app interface 134. Then, the app interface 134 may send one or more service requests indicating these permissibly adjusted time period options to one or more of the client devices 112 for use by the native application. The app interface 134 may receive one or more service requests at least one of the one or more client devices 112 indicating one or more preferred time periods, which may be a selection of one or of the one or more permissibly adjusted time period options, and the app interface 134 may input this indication to the application server side runtime. Further resource-allocation functionality of the application server side runtime 140 may be provided to the client devices via the app interface 134 using similar mechanisms.

The one or more interfaces 130 may include a text interface 136. The text interface 136 may provide functionality of the application server side runtime 140 to the client devices 112 via messages communicated between the text interface 136 and the client devices 112. The text interface 136 may receive one or more messages (e.g. short message service (SMS) messages, rich communication service (RCS) messages, messaging app messages, social network messages) from one of the client devices 112 where the one or more messages include a request to allocate resources to a series of recurring events. In response to these one or more messages, the text interface 136 may input a resource-allocation request based on the request in the one or more messages to the application server side runtime 140. In response to the resource-allocation requests the application server side runtime 140 may send one or more messages indicative of permissibly adjusted time period options to the text interface 136. Then, the text interface 136 may send one or more messages including the permissibly adjusted time period options to one or more of the client devices. The text interface 136 may receive one or more messages from at least one of the one or more client devices indicating a indicating one or more preferred time periods, which may be a selection of one or of the one or more permissibly adjusted time period options, and the text interface 136 may input this indication to the application server side runtime 140. Further resource-allocation functionality of the application server side runtime 140 may be provided to the client devices 112 via the text interface 136 using similar mechanisms.

The computer system 100 includes the application server side runtime 140. The application server side runtime 140 may be a computer program, or multiple computer programs, implemented on a single computing device or over a plurality of computing devices. The application server side runtime 140 provides resource-allocation functionality. For example, the application server side runtime 140 may access a resource allocation plan, and provide the resource allocation plan or a part thereof to one or more interfaces in response to requests from one of the interfaces 130, e.g. in response to a request (e.g. an API call and/or service request) from one of the interfaces 130. The resource allocation plan may include allocations of resources to time periods for one or more series of recurring events, and the resource allocation plan may be stored in a database 150 and/or accessible through data interfaces 160. As another example, the application server side runtime 140 may receive a request from one of the interfaces 130 to allocate one or more resources to a series of recurring events. In response to the request, the application server side runtime 140 may communicate with the database 150, the data interfaces 160 and/or a resource allocation engine 190 (either directly or indirectly via the database) to allocate the one or more resources to the series of recurring events.

The computer system 100 includes the database 150. The data stored in the database 150 includes resource allocation information, e.g. a resource allocation plan. The database 150 provides data storage and access functionality, e.g. functionality whereby data can be written to and read from the database 150. The database 150 may also facilitate the deletion of data from the database. The database 150 may be any combination of software and hardware capable of providing this functionality. For example, the database software may be: a relational database server, e.g. a Standard Query Language (SQL) database server; a NoSQL database server, e.g. a key-value store server, a column store server, a document store server or a graph database server; or a file storage server, e.g. a file transfer protocol. The hardware on which the database software is implemented may be one or more suitable computing devices, e.g. one or more server computing devices and/or one or more computing devices of a cloud computing system.

The database 150 is configured to interact with the application server side runtime such that the application server side runtime 140 may read data from and write data to the database 150. The database 150 may communicate with, e.g. receive data to be written from and provide data to be read to, the application server side runtime 140 over a network of any of the types previously mentioned. The database 150 may communicate using a database specific communication technology, e.g. a database specific protocol, or a widely applicable communication technology, e.g. SOAP or REST service calls. Alternatively or additionally, the database 150 may communicate with the application server side runtime 140 using API calls, interprocess communication and/or shared storage. The aforementioned communication technologies may be particularly applicable when the database 150 and the application server side runtime 140 are hosted on the same computing device.

The computer system 100 also includes one or more data interfaces 160. The one or more data interfaces 160 are configured to load data from one or more data repositories 170 into the database 150. The one or more data interfaces 160 may also synchronise changes to the corresponding data loaded into the database 150, e.g. updates to the database by the application server side runtime 140, back to the data repositories. The one or more data interfaces 160 may be one or more computer programs implemented on a single computing device or over a plurality of computing devices. For example, each of the one or more interfaces may be implemented as individual computer programs and each of the individual computer programs may be hosted on a different computing device, or the one or more interfaces may be implemented as a single computer program hosted on a single computing device.

Each of the one or more data repositories 170 may be part of the computer system 100 or external to the computer system 100. Each of the data repositories 170 may be implemented using any hardware and/or software combination using which the relevant data can be loaded and provided to the one or more data interfaces. For example, each of the data repositories 170 may be or include a database flat file storage application specific data stores; and/or applications for dynamic data generation and/or transformation. Furthermore, in an alternative embodiment, the data repositories 170 are integrated within the database 150 itself. In this case, there may be no need for the data interface 160.

The one or more data repositories may include a resource data repository 172. The resource data repository includes information about one or more resources. For example, the resource data repository 172 may include properties of each of the one or more resources.

The one or more resources may include, for example: human resources, e.g. persons such as staff, contractors, external partners and clients; event locations, e.g. confluence locations, such as meeting room, and/or conference locations, such as a convention center or assembly hall; specialized equipment that may be only used by one person at a time, such as a 3D printer or motion capture device; computing devices, e.g. desktop, laptop and tablet computers; data storage, e.g. the amount of data storage available on one or more file storage servers at one or more locations; network capacity, e.g. the amount of network bandwidth available in a local area network and/or a shared internet connection; equipment, e.g. printers, telecommunication equipment or video conferencing equipment; workspace such as laboratory space or office space, e.g. in terms of physical space or other workspace resources, such as desks and/or gymnasium space and equipment.

Examples of properties of these resources that may be included in the resource data repository information 172 follow. For human resources, the properties of a person may include a name of the person; a role of the person; an organization of the person; a department of the person; and a seniority of the person. For event locations, the properties of an event location may include: a geographic location, e.g. the address of the event location; a building location, e.g. which floor and/or section of a building, such as an office, the event location is on; a name, e.g. the name of a meeting room; a capacity, e.g. a maximum number of persons that can be accommodated in the event location; a size, e.g. the dimensions and/or area of the event location; lighting, e.g. an indication of an amount of natural light available at the event location; décor, e.g. an indication as to whether the event location is sufficiently well decorated to host events involving external persons; and/or fixed equipment at the event location, e.g. whether the event location has a projector, a sound system, videoconferencing equipment, tables, seating, and/or a whiteboard. For specialized equipment, the properties of the resources may include the model of the specialized equipment and its suitability for particular tasks, e.g. for a 3D printer, the materials with which it can be used and the maximum print size. For data storage, the properties of the data storage may include a data access bandwidth and latency, and a data storage type, such as whether it is persistent or temporary storage. For a computing device, the properties of the computing device may include the processing power, the memory available, the operating system and the software installed. For network capacity, the properties of the network capacity may include the latency of the network or a part thereof; the type of the network capacity, such as whether it is wired or wireless network capacity; the location of the network capacity, and/or security of the network capacity. For equipment, the equipment properties may include the type of the equipment, the model of the equipment, and/or technical specifications of the equipment, e.g. the number of pages per minute that a printer can print or the video quality (e.g. resolution) of video conferencing equipment. For workspace, the properties may include the type of workspace, the size of the workspace, equipment located in or otherwise associated with the workspace, and the number of people that may simultaneously use the workspace. For workspace resources, such as desks, the properties may include: a number of desks, any associated equipment (in general or for each desk), e.g. whether a phone, video conferencing equipment, multiple monitor setup, and/or a laptop dock is available; size and/or dimensions; and/or whether the desk/workspace is sound isolated. For gymnasium equipment, the properties may include the type of gymnasium equipment; muscle groups associated with gymnasium equipment; a weight of the gymnasium equipment; and a size of the gymnasium equipment.

The one or more data repositories 170 may include a resource availability data repository 174. The resource availability data repository 174 includes resource availability data for one or more resources. Resource availability data may include, but is not limited to, times when each of the one or more resources are available; the amounts of a particular resource of the one or more resources that are available: and/or the amount of resources of a given type that are available, e.g. how many computing devices are available.

For human resources, the availability data repository 174 may include person-specific availability data for one or more persons of the one or more resources. The person-specific availability data may be sourced from calendars of the one or more persons, e.g. from calendar data of a calendar application. The person-specific availability data may alternatively or additionally be sourced from a human resources (HR) system designating absence data indicating that at least one of the one or more persons is not expected in be available at a given time (e.g. because of annual leave absence, sickness absence, non-working days (e.g. for part-time workers) and/or public holidays). The person-specific availability data may alternatively or additionally be sourced by processing emails of at least some of the one or more persons, with their consent, to determine time periods when they are not expected to be available which have not been included in their calendars. The person-specific availability data may include data for future time periods such that future events may be scheduled for when persons are available based on their stated or inferred future availability. The person-specific availability data may also include historic data indicating when given persons were available or not available in the past. Such historic data may be used to infer when persons are likely to be available or not during future time periods. For example, a person may have been unavailable at a given time period on a given day on most weeks for the past year but may not have included this in their calendar for the coming week. However, it is reasonably likely that this may be an oversight by the person, and the persons will, in fact, also be unavailable this week, so scheduling events including the person at the given time period on the given day should still be avoided.

For human resources, the availability data repository 174 may include generic availability data indicating when all, most or a group of the one or more are unavailable. For example, the generic availability data may include data indicating that all persons except for a skeleton group of persons will not be available on a given day, e.g. because of a public holiday, an emergency, an information systems outage or government-mandated closure. As another example, the generic availability data may include data indicating that a group of persons are unavailable over a designated lunch break period for that group of persons. The generic availability data may also include data indicating that persons will be available within certain working hours except for conflicts and variations. Generic availability data may be sourced from a facilities management system, a human resources system and/or a calendar system.

The one or more data repositories 170 may include a resource importance data repository 176. The resource importance data repository 176 includes indications of the importance of one or more resources. The importance of each of the one or more resources may indicate the relative importance of each resource to events. The importance may include a general importance and/or one or more specific importances. The general importance may indicate an overall importance of a resource compared to other resources. Each of the one or more specific importances may indicate the importance of a resource for a particular series of recurring events compared to other resources to be allocated for that particular series of recurring events; and/or the one or more specific importances may indicate the importance of a resource compared to other resources for a particular type of a series of recurring events.

The one or more data repositories 170 may include an expected location data repository 178. The expected location data repository 178 may include expected location data for at least a portion of the one or more resources, e.g. movable resources of the one or more resources. The expected location data may indicate the expected location of the at least a portion of the one or more resources over one or more future time periods. The expected location data may be sourced from one or more resource management systems, e.g. an enterprise resource planning system. Expected location data for non-human resources may be sourced from the one or more resource management systems. Expected location data for human resources may be sourced from other systems.

For human resources, the expected location data repository 178 may include person-specific expected location data for one or more persons of the one or more resources. The person-specific location data may be sourced from calendars of the one or more person, e.g. from calendar data of a calendar application, which may indicate where the person is planning to be, e.g. at home or in the office, at one or more time periods. The person-specific expected location data may alternatively or additionally be sourced from a human resources (HR) system designating days of the week where it has been agreed that the person will be in the office. The person-specific expected location data may alternatively or additionally be sourced by processing email of certain persons, with the persons' consent, to determine where the location of the person where this may not be available or may differ from what is included in the calendar data. The person-specific expected location data may include data for future time periods such that it can be determined whether a person is expected to attend events in-person or remotely.

The person-specific expected location data may also include historic data indicating where given persons were in the past. Such historic data may be used to infer where persons are likely to be during future time periods. For example, a person may have been at a given location on a given day of the week for most weeks of the year but may have not indicated this in their calendar for the coming week. However, it is reasonably likely that this may be an oversight by the person, and the person will, in fact be at the given location on the given day of the week. In addition to one or more of the data sources previously indicated, the historic data may include location tracker data indicating the past location of persons which has been collected with the persons' consent. The persons may also limit when such location tracker data may be collected and the granularity of this location tracker data, e.g. a person may indicate that location tracker data can only be collected on working days and only to the nearest kilometre. The location tracker data may be collected using devices including a global positioning system (GPS) receiver component carried by persons, such as the persons' smartphones. The location tracker data may be used to determine whether, at given times and days of the week in the past, the person was at a given location and when they are likely to be at the given location in future.

For human resources, the expected location data repository 178 may include generic expected location data. The generic expected location data may indicate where all or most or a group of the one or more persons are expected to be at one or more time periods. For example, the generic availability data may include data indicating that all persons (or all persons except for a skeleton group of persons) are not expected to be in the office on a given day, e.g. because of a public holiday, an emergency, refurbishment of an office or part thereof, or a government-mandated office closure. Such generic expected location data may, in certain instances, override person-specific expected location data. For example, if an office is closed then a person cannot be in the office even if the person-specific expected location data indicates otherwise. Generic expected location data may be sourced from a facilities management system, a human resources system and/or a calendar system.

The computer system 100 includes resource-allocation configuration data 180. The resource-allocation configuration data 180 may be stored in the database 150 and/or may be stored as settings associated with a resource allocation engine 190, e.g. associated registry settings or a configuration file. The resource-allocation configuration data 180 is used by the resource-allocation engine 190 in allocating resources to time periods for series of recurring events.

The resource-allocation configuration data 180 may include repetition objectives data 182. The repetition objectives data may include repetition objectives themselves and associated data. The repetition objectives may be of any of the types previously described. The associated data may include one or more associations of repetition objectives with respective identifiers, e.g. a numerical ID or name for the repetition objective. These respective identifiers may be included in requests to allocate resources to a series of recurring events, such that the details of the repetition objective may not be included in the request and instead looked up by utilizing the association. As these details are not included in the request, the network bandwidth used in making the request may be reduced. The associated data may include one or more association of repetition objectives with types of series of recurring events. The type may be include in requests to allocate resources to a series of recurring events, such that the details of the repetition objective may not be included in the request and instead inferred based on the type. As these details are not included in the request, the network bandwidth used in making the request may be reduced. Furthermore, the maintainability of the computer system 100 may be increased as repetition objectives may be changed for a type of series of recurring events without changes to each of these requests.

The resource-allocation configuration data 180 may include adjustment criteria data 184. The adjustment criteria data may include adjustment criteria themselves and associated data. The adjustment criteria may be of any of the types previously described. The associated data may include one or more associations of adjustment criteria with respective identifiers, e.g. a numerical ID or name for the adjustment criteria. These respective identifiers may be included in requests to allocate resources to a series of recurring events, such that the details of the adjustment criteria may not be included in the request and instead looked up by utilizing the association. As these details are not included in the request, the network bandwidth used in making the request may be reduced. The associated data may include one or more association of adjustment criteria with types of series of recurring events. The type may be included in requests to allocate resources to a series of recurring events, such that the details of the adjustment criteria may not be included in the request and instead inferred based on the type. As these details are not included in the request, the network bandwidth used in making the request may be reduced. Furthermore, the maintainability of the computer system 100 may be increased as adjustment criteria may be changed for a type of series of recurring events without changes to each of these requests.

The resource allocation configuration data 180 may include preference data 186. The preference data may indicate time period preferences of one or more resources, e.g. one or more time periods when one or more persons would prefer to be allocated. For example, a person may prefer to be allocated to a time period for an event that is in the afternoon but is available to be allocated to a time period in the morning.

The resource allocation configuration data 180 may include constraint specification data 188. The constraint specification data 188 may indicate rules and/or other criteria that the allocations of resources to the time periods for series of recurring events must satisfy. For example, the constraint specification data 188 may include maximum occupancy or density of occupancy indicating that no more than a maximum amount of a type of one or more resources should be allocated at a given time period in a given location. This may be defined by technical or regulatory requirements, such as health and safety rules. Such rules may include social distancing rules or fire safety rules. For instance, social distancing rules may specify that one or more resources, e.g. human resources such as persons, should not be assigned to a given time period at or proximate to a given location that would result in them being less than a certain distance (e.g. one meter or two meters) apart. Equally, fire safety rules may limit the number of resources, e.g. human resources such as persons, that may be assigned to a given time period in an area associated with a particular fire exit.

The computer system 100 includes the resource allocation engine 190. The resource allocation engine 190 may be a computer program, or multiple computer programs, implemented on a single computing device or over a plurality of computing devices.

The resource allocation engine 190 generates an allocation of one or more resources to a series of recurring events based on data from the database 150, the one or more data repositories 170, the resource allocation configuration data 180, and/or data include in a request to allocate the one or more resources to the series of recurring events. The resource allocation engine 190 may store the allocation in the database 150.

Recurring Event Series Scheduling Method

FIG. 2 illustrates an example method 200 for scheduling a series of recurring events. The example method may be implemented as one or more computer-executable instructions executed on one or more computing devices, e.g. the computing device 500 described in relation to FIG. 5. The example method may be performed by the resource allocation engine 190 described with respect to FIG. 1. Optional steps are indicated via dashed lines.

At step 210, one or more requests to allocate one or more resources to a series of recurring events are received. The one or more resources may be of any of the types described in relation to the resource data repository 172 of the computer system 100. For example, the one or more resources may include persons and event locations. The series of recurring events may be a series of recurring confluences, e.g. a series of recurring meetings or assemblies. The one or more requests may be or include a request to allocate a desired plurality of resources including the one or more resources and one or more unavailable resources. The request may have been received from a client device, e.g. one of the client devices 112 of the computer system 100.

The request specifies, for each event, a corresponding desired time period over which the one or more resources are to be allocated. The request may include one or more repetition objectives for specifying the corresponding time period for each event. The one or more repetition objectives may include one or more of a recurrence definition, a periodicity definition, a day reference definition and/or a named day definition. Further details of the one or more repetition objectives have been described in relation to FIG. 1.

The request further specifies one or more adjustment criteria for defining one or more permissibly adjusted time periods, for one or more of the events, one or more permissibly adjusted time periods from the desired time period. For example, the one or more adjustment criteria may be used to derive one or more permissibly adjusted time periods from a desired time period. The one or more adjustment criteria may include one or more of a time range; a date range; a time flexibility parameter; a date flexibility parameter; a plurality of time alternatives; and/or a plurality of date alternatives. The one or more adjustment criteria may include one or more adjustment constraints. Further details of the adjustment criteria and how they may be combined have been described in relation to FIG. 1.

The receiving of the one or more requests of step 210 may be subsequent to receiving an initial request to allocate one or more resources to a first event. Alternatively, the initial request may be included in the one or more requests of step 210. The initial request may specify a time interval, e.g. a week or month, within which the one or more resources are to be allocated. In response to the initial request, first resource availability data indicative of an availability of the one or more resources during the time interval may be obtained. Then, a first time period for the first event may be determined based on the resource availability during determining, based on the first resource availability data, a first time period for the first event; and allocating the one or more resources to the first time period. The one or more resources may be allocated to the first time period. One or more of the desired time periods of the one or more request of step 210 may be based directly or indirectly on the first time period. For example, the desired time period for the earliest of the series of recurring events of step 210 may be based on the first time period, and each of the desired time periods for subsequent events of the series of recurring events may be based on the desired time period for the previous event. In some implementations, the initial request may be received from a person, and the one or more requests of step 210 may be initiated without further user intervention, e.g. automatically initiated, subsequent to the initial request.

At step 220, for each event of the series of recurring events, resource availability data indicative of the availability of the one or more resources during the desired time period is obtained. The obtained resource availability data for each event of the series of recurring events may include, but is not limited to, data indicating whether the one or more resources are available during the desired time period; and/or the amounts of the one or more resources that are available during the desired time period. The resource availability data may be of any of the types described in relation to the resource availability data repository 174 of the computer system 100.

At step 230, where the one or more requests are or include a request to allocate a desired plurality of resources including the one or more resources and the one or more unavailable resources, importance data indicative of a relative importance of the one or more resources and the one or more unavailable resources may be obtained for at least one of the events of the series of recurring events. The importance of each of the one or more resources and/or one or more unavailable resources may indicate the relative importance of each resource to events. The importance may include a general importance and/or a specific importance. The general importance may indicate an overall importance of a resource compared to other resources. The specific importance may indicate the importance of a resource to the series of recurring events compared to other resources to be allocated for the series of recurring events. The resource importance data may be obtained from a resource importance data repository, e.g. resource importance data repository 176. Alternatively, or in addition, the importance data may be specified in the request (e.g. the requesting person may specify that certain resources are important or essential for the event).

At step 240, expected location data indicative of an expected location of at least a portion of the one or more resources during the desired time period is obtained for at least one event of the series of recurring events. The expected location data may indicate the expected locations of at least a portion of the one or more resources, e.g. one or more movable resources of the movable resources, during the desired time period. The expected location data may be of any of the types described in relation to the expected location data repository 178 of the computer system 100.

At step 250, preference data is obtained. The preference data is indicative of one or more time period preferences of at least a portion of the one or more resources, e.g. one or more persons of the one or more resources. The time period preferences may indicate one or more time periods when one or more persons of the one or more resources would prefer to be allocated. The one or more time period preferences may indicate a preference for a certain one or more time periods of the one or more permissibly adjusted time periods.

For each event of the series of recurring events, steps 260 and 270 are performed.

At step 260, a viable time period which is determined. The viable time period is either the desired time period or a permissibly adjusted time period. The viable time period is determined based on at least the resource availability data. Where expected location data, resource importance data, and/or preference data have been obtained, the determination of the viable time period may be based on any or any combination of these. Implementations of step 260 are described with respect to FIG. 3.

At step 270, the one or more resources are allocated to the viable time period. Allocating the one or more resources to the viable time period may include storing an indication of the allocation of the one or more resources to the viable time period in a database or to a data store of an external system, e.g. a calendar application data store or an external resource allocation system data store.

Viable Time Period Determination Method

FIG. 3 illustrates a first method 260-A and a second method 260-B for implementing the viable time period determination step 260. For the sake of clarity, the first method 260-A and the second method 260-B are described independently. However, these two methods and steps thereof may be combined as appropriate.

The first method 260-A includes the steps 310, 320 and 330.

At step 310, it is determined that at least one of the one or more resources is unavailable at the desired time period based on the resource availability data. The determination that at least one of the one or more resources is unavailable at the desired time period may include determining that a quorum amount or proportion of the at least one of the one or more resources are not available at the desired time period. For example, the at least one of the one or more resources may include persons having a specified role, e.g. software engineers, and at least a minimum number, e.g. at least three, or minimum proportion, e.g. at least half, may not be available at the desired time period.

At step 320, one or more permissibly adjusted time periods are determined. This determination may be in response to determining that the at least one of the one or more resources is unavailable at the desired time period. The determination of the one or more permissibly adjusted time periods may include deriving one or more permissibly adjusted time periods from the desired time period using the adjustment criteria. The one or more permissibly adjusted time periods may be a plurality of permissibly adjusted time periods.

At step 330, the viable time period is set to be one of the one or more permissibly adjusted time periods. The setting of the viable time period to the one of the one or more permissibly adjusted time periods may be or include an optimization procedure to select a best viable time period of the one or more permissibly adjusted time periods. The optimization procedure may select the best viable time period based on one or more of the resource availability data, the expected location data, and/or the preference data. The optimization procedure may select the best viable time period in accordance with one or more optimization values and/or criteria calculated based on the data used in the optimization. Those of the one or more permissibly adjusted time periods selectable by the optimization procedure may be limited by one or more constraints defined by constraint specification data.

Step 330 may include a step 332 where it is determined, based on the resource availability data, that the at least one of the one or more resources are available at the one of the one or more permissibly adjusted time periods. For example, the one or more permissibly adjusted time periods may be a plurality of permissibly adjusted time periods. In the plurality of permissibly adjusted time periods, there may be one or more time periods where the one or more resources are available and one or more other time periods where the one or more resources are not available. Therefore, the viable time period may be set to one of the plurality of permissibly adjusted time periods at which the one or more resources are available. Where there are multiple permissibly adjusted time periods of the plurality of permissibly adjusted time periods at which the one or more resources are available, the viable time period may be set to one of these multiple permissibly adjusted time periods based on a determination of one of these time periods as having the most available resources, based on preference data where this has been obtained, or based on a combination thereof. Where expected location data has been obtained, the viable time period may be set based on this, e.g. the viable time period may be set to one of the plurality of permissibly adjusted time periods at which the one or more resources are proximate to each other.

Step 330 may include a step 334 where it is determined, based on the resource importance data, that at least one of the one or more resources is of a greater importance than one or more unavailable resources of the desired plurality of resources. This determination may be used to set the viable time period as there may not be a permissibly adjusted time period at which all of the desired plurality of resources are available. Therefore, the viable time period may be set to one of the permissibly adjusted time periods at which resources of a greater importance are available.

The second method 260-B includes the steps 340, 350 and 360.

At step 340, one or more permissibly adjusted time period options are provided to one or more persons. The one or more persons may be at least a portion of the one or more resources. Providing the one or more permissibly adjusted time period options to the one or more persons may include a step 342 where the one or more permissibly adjusted time period options are sent to one or more computing devices of the one or more persons. The one or more time period options may be sent using any of the methods described with respect to the one or more interfaces 130 of the computer system 100, e.g. the one or more time period options may be sent as service requests, web content or messages. The one or more computing devices may be respective client devices of the one or more persons, e.g. the client devices 112 of the computer system 100. The one or more computing devices may present the one or more time period options to the respective one or more persons, e.g. display or audibly output the one or more time period options.

At step 350, one or more indications of one or more preferred time periods are received. The one or more indications may be based on one or more inputs by at least one of the one or more persons in response to the provision of the one or more permissibly adjusted time period options. The one or more indications of the preferred time periods may include one or more selections of at least one of the one or more permissibly adjusted time period options. These one or more selections may be based on one or more selection inputs by the at least one of the one or more persons, e.g. selecting at least one user interface element corresponding to the at least one of the one or more permissibly adjusted time period options. Alternatively or additionally, the one or more indications of the preferred time periods may include a time period that is not one of the permissibly adjusted time period options. This time period may be a permissibly adjusted time period that was not included in the permissibly adjusted time period options.

At step 360, the viable time period is determined based on the received one or more indications of the one or more preferred time periods. The viable time period may be determined to be a most popular of the one or more preferred time periods, e.g. the time period that has been indicated as being preferred the greatest number of times.

For example, where the one or more indications are one or more selections of at least one of the one or more permissibly adjusted time period options, the viable time period may be determined as the one of the one or more permissibly adjusted time period options that has been selected the greatest number of times.

Time Period Update Method

FIG. 4 illustrates an example method 400 for updating one or more time periods based on updated resource availability. The example method may be implemented as one or more computer-executable instructions executed on one or more computing devices, e.g. the computing device 500 described in relation to FIG. 5. The example method may be performed by the resource allocation engine 190 and/or the application server side runtime described with respect to FIG. 1. Optional steps are indicated via dashed lines.

The example method 400 is performed subsequent to the example method 200. For example, the example method 200 may have allocated the one or more resources to previously viable time periods for a series of recurring events based on previous resource availability data. The adjustment criteria and desired time periods derived by the example method 200 may be maintained and/or regenerated and are used by the example method 400. The example method 400 may be performed at a subsequent time, e.g. an hour, day or week later, at which updated resource availability data is available.

At step 410, updated resource availability data is obtained for at least one event of the series of recurring events. The updated resource availability data is indicative of an updated availability of the one or more resources during the (previously) viable time period for the at least one event.

At step 420, an updated viable time period for the at least one event is determined based on the updated resource availability data. The updated viable time period is either the desired time period or a permissibly adjusted time period.

Step 420 may include a step 422, where it is determined, based on the updated resource availability data, that at least one of the one or more resources is unavailable at the (previously) viable time period. For example, the (previous) resource availability data may have indicated that the at least one of the one or more resources are available at the (previously) viable time period, while the updated resource availability data indicates that they are no longer available, e.g. because the one or more resources have been allocated to another event at the (previously) viable time period.

Step 420 may include a step 424, where it is determined, based on the updated resource availability data, that the at least one of the one or more resource is available at one or more other time periods. Each of the one or more other time periods is the desired time period or a permissibly adjusted time period. Each of the permissibly adjusted time periods of the one or more other time periods may be derived from the desired time period using the adjustment criteria.

Step 420 may include a step 426, where the updated viable time period is set to be one of the one or more other time periods. The updated viable time period may be set to one of the one or more other time periods based on preference data where this has been obtained, based on a determination of one of these time periods as having the most available resources, or based on a combination thereof. Where expected location data has been obtained, the updated viable time period may be set based on this, e.g. the updated viable time period may be set to one of the one or more other time periods at which the one or more resources are proximate to each other. The setting of the updated viable time period to the one of the one or more other time periods may be or include an optimization procedure to select a best updated viable time period of the one or more other time periods. The optimization procedure may select the best updated viable time period based on one or more of the updated resource availability data, the expected location data, and/or the preference data. The optimization procedure may select the best updated viable time period in accordance with one or more optimization values and/or criteria calculated based on the data used in the optimization. Those of the one or more other time periods selectable by the optimization procedure may be limited by one or more constraints defined by constraint specification data.

At step 430, the one or more resources are allocated to the updated viable time period for the at least one event. The allocation of the one or more resources to the updated viable time period may be a reallocation of the one or more resources from the (previous) viable time period to the updated viable time period. The allocation of the one or more resources may include updating an indication of the allocation of the one or more resources in a database or a data store of an external system, e.g. a calendar application data store or an external resource allocation system data store, to indicate that the one or more resources are allocated to the updated viable time period.

Computing Device

Figure 5:
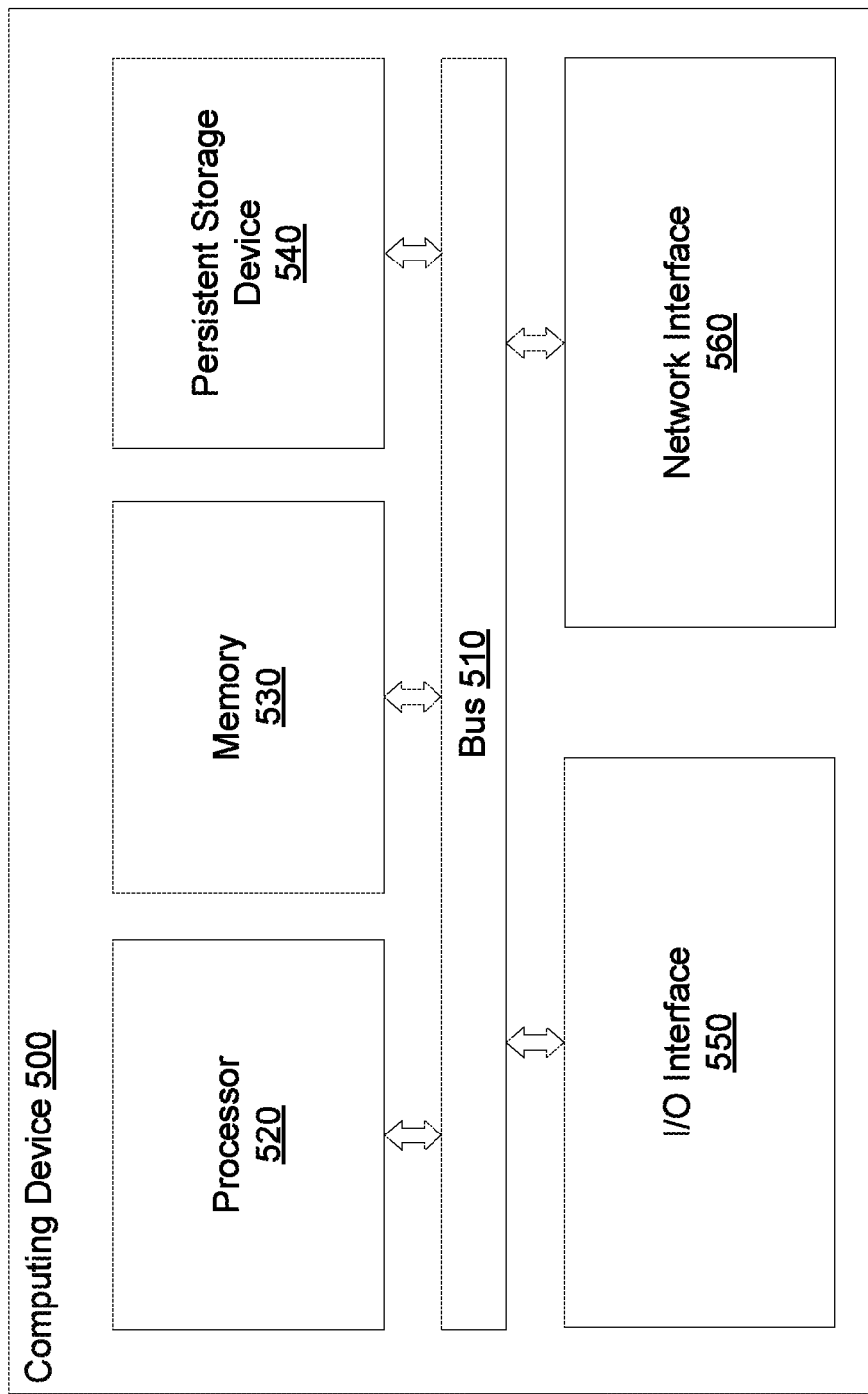
FIG. 5 shows a computing device using which the embodiments described herein may be implemented.

FIG. 5 shows a computing device 500 using which the embodiments described herein may be implemented.

The computing device 500 includes a bus 510, a processor 520, a memory 530, a persistent storage device 540, an Input/Output (I/O) interface 550, and a network interface 560.

The bus 510 interconnects the components of the computing device 500. The bus may be any circuitry suitable for interconnecting the components of the computing device 500. For example, where the computing device 500 is a desktop or laptop computer, the bus 510 may be an internal bus located on a computer motherboard of the computing device. As another example, where the computing device 500 is a smartphone or tablet, the bus 510 may be a global bus of a system on a chip (SoC).

The processor 520 is a processing device configured to perform computer-executable instructions loaded from the memory 530. Prior to and/or during the performance of computer-executable instructions, the processor may load computer-executable instructions over the bus from the memory 530 into one or more caches and/or one or more registers of the processor. The processor 520 may be a central processing unit with a suitable computer architecture, e.g. an x86-64 or ARM architecture. The processor 520 may include or alternatively be specialized hardware adapted for application-specific operations.

The memory 530 is configured to store instructions and data for utilization by the processor 520. The memory 530 may be a non-transitory volatile memory device, such as a random access memory (RAM) device. In response to one or more operations by the processor, instructions and/or data may be loaded into the memory 530 from the persistent storage device 540 over the bus, in preparation for one or more operations by the processor utilising these instructions and/or data.

The persistent storage device 540 is a non-transitory non-volatile storage device, such as a flash memory, a solid state disk (SSD), or a hard disk drive (HDD). A non-volatile storage device maintains data stored on the storage device after power has been lost.

The persistent storage device 540 may have a significantly greater access latency and lower bandwidth than the memory 530, e.g. it may take significantly longer to read and write data to/from the persistent storage device 540 than to/from the memory 530. However, the persistent storage 540 may have a significantly greater storage capacity than the memory 530.

The I/O interface 550 facilitates connections between the computing device and external peripherals. The I/O interface 550 may receive signals from a given external peripheral, e.g. a keyboard or mouse, convert them into a format intelligible by the processor 520 and relay them onto the bus for processing by the processor 520. The I/O interface 550 may also receive signals from the processor 520 and/or data from the memory 530, convert them into a format intelligible by a given external peripheral, e.g. a printer or display, and relay them to the given external peripheral.

The network interface 560 facilitates connections between the computing device and one or more other computing devices over a network. For example, the network interface 560 may be an Ethernet network interface, a Wi-Fi network interface, or a cellular network interface.

Implementations of the subject matter and the operations described in this specification can be realized in digital electronic circuitry, or in computer software, firmware, or hardware, including the structures disclosed in this specification and their structural equivalents, or in combinations of one or more of them. For instance, hardware may include processors, microprocessors, electronic circuitry, electronic components, integrated circuits, etc. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A computer-implemented method for scheduling a series of recurring events, the method comprising:
   receiving one or more requests to allocate one or more resources to the series of recurring events, wherein the one or more requests specify, for each event, a corresponding desired time period over which the one or more resources are to be allocated, and the one or more requests further specify one or more adjustment criteria for defining, for one or more of the events, one or more permissibly adjusted time periods from the desired time period;
   obtaining, for each event, resource availability data indicative of an availability of the one or more resources during the desired time period; and
   for each event:
      determining, based on the resource availability data, a viable time period, wherein the viable time period is either the desired time period or a permissibly adjusted time period that satisfies the one or more adjustment criteria; and
      allocating the one or more resources to the viable time period;
   wherein for at least one event of the series of recurring events, determining the viable time period comprises:
      determining, based on the resource availability data, that at least one of the one or more resources is unavailable at the desired time period;
      in response to determining that the at least one of the one or more resources is unavailable at the desired time period, determining the one or more permissibly adjusted time periods from the one or more adjustment criteria; and
      setting the viable time period to be one of the one or more permissibly adjusted time periods;
   wherein the one or more requests comprise a request to allocate a desired plurality of resources comprising the one or more resources and the one or more unavailable resources;
   wherein the method further comprises, for the at least one event: obtaining resource importance data indicative of a relative importance of the at least one of the one or more resources and the one or more unavailable resources; and
   wherein setting the viable time period comprises: determining, based on the resource importance data, that the at least one of the one or more resources is of greater importance than the one or more unavailable resources.

2. The computer-implemented method of claim 1, further comprising:
   receiving a request to allocate the one or more resources to a first event, wherein the request specifies a time interval within which the one or more resources are to be allocated;
   obtaining first resource availability data indicative of an availability of the one or more resources during the time interval;
   determining, based on the first resource availability data, a first time period for the first event; and
   allocating the one or more resources to the first time period.

3. The computer-implemented method of claim 1, wherein at least one of the desired time periods is based on the first time period.

4. The computer-implemented method of claim 1, wherein setting the viable time period to be the one of the one permissibly adjusted time periods comprises:
   determining, based on the resource availability data, that the at least one of the one or more resources are available at the one of the one or more permissibly adjusted time periods.

5. The computer-implemented method of claim 1, wherein the one or more requests comprise one or more repetition objectives for specifying the corresponding desired time period for each event.

6. The computer-implemented method of claim 5, wherein the one or more repetition objectives comprise one or more of a recurrence definition, a periodicity definition, a day reference definition and/or a named day definition.

7. The computer-implemented method of claim 1, wherein the one or more adjustment criteria comprise one or more of a time range; a date range; a time flexibility parameter; a date flexibility parameter; a plurality of time alternatives; and/or a plurality of date alternatives.

8. The computer-implemented method of claim 1, wherein the one or more adjustment criteria comprise one or more adjustment constraints specifying limitations to the permissible adjustments to the desired time period.

9. The computer-implemented method of claim 8, wherein the one or more adjustment constraints comprise one or more exclusion indicators specifying one or more time periods excluded from the one or more permissibly adjusted time periods and/or a repetition restriction specifying a minimum time interval between the one or more permissibly adjusted time periods and a previous viable time period.

10. The computer-implemented method of claim 1, wherein the one or more resources comprise one or more persons.

11. The computer-implemented method of claim 10, wherein, for at least one event of the series of recurring events, determining the viable time period comprises:
   providing, to the one or more persons, one or more permissibly adjusted time period options;
   receiving one or more indications of one or more preferred time periods, wherein the one or more indications are based on one or more inputs by at least one of the one or more persons in response to the provision of the one or more permissibly adjusted time period options; and
   determining the viable time period based on the received one or more indications of the one or more preferred time periods.

12. The computer-implemented method of claim 11, wherein the one or more permissibly adjusted time period options comprise the viable time period, and wherein at least one of the one or more inputs comprises a selection of the viable time period.

13. The computer-implemented method of claim 10, further comprising, for at least one event of the series of recurring events:
   obtaining preference data indicative of one or more time period preferences of at least one of the one or more persons,
and wherein the determination of the viable time period for the at least one event is based on the preference data.

14. The computer-implemented method of claim 1, wherein the series of recurring events is a series of recurring confluences.

15. The computer-implemented method of claim 1, further comprising:
   obtaining, for at least one event of the series of recurring events, updated resource availability data indicative of an updated availability of the one or more resources during the viable time period;
   determining, based on the updated resource availability data, an updated viable time period for the at least one event, wherein the updated viable time period is either the desired time period or a permissibly adjusted time period; and
   allocating the one or more resources, for the at least one event, to the updated viable time period.

16. The computer-implemented method of claim 15, wherein determining the updated viable time period comprises:
   determining, based on the updated resource availability data, that at least one of the one or more resources is unavailable at the previous viable time period;
   in response to determining that the at least one of the one or more resources is unavailable at the viable time period, determining, based on the updated resource availability data, that the at least one of the one or more resources is available at one or more other time periods, wherein each of the one or more other time periods is the desired time period or a permissibly adjusted time period; and
   setting the updated viable time period to be one of the one or more other time periods.

17. A computer-implemented method for scheduling a series of recurring events, the method comprising:
   receiving one or more requests to allocate one or more resources to the series of recurring events, wherein the one or more requests specify, for each event, a corresponding desired time period over which the one or more resources are to be allocated, and the one or more requests further specify one or more adjustment criteria for defining, for one or more of the events, one or more permissibly adjusted time periods from the desired time period;
   obtaining, for each event, resource availability data indicative of an availability of the one or more resources during the desired time period, and
   for each event:
      determining, based on the resource availability data, a viable time period, wherein the viable time period is either the desired time period or a permissibly adjusted time period that satisfies the one or more adjustment criteria; and
      allocating the one or more resources to the viable time period;
   wherein the one or more resources comprise one or more persons; and
   wherein, for at least one event of the series of recurring events, determining the viable time period comprises:
      providing, to the one or more persons, one or more permissibly adjusted time period options;
      receiving one or more indications of one or more preferred time periods, wherein the one or more indications are based on one or more inputs by at least one of the one or more persons in response to the provision of the one or more permissibly adjusted time period options; and
      determining the viable time period based on the received one or more indications of the one or more preferred time periods.

18. The computer-implemented method of claim 17, wherein the one or more permissibly adjusted time period options comprise the viable time period, and wherein at least one of the one or more inputs comprises a selection of the viable time period.

19. A computer-implemented method for scheduling a series of recurring events, the method comprising:
   receiving one or more requests to allocate one or more resources to the series of recurring events, wherein the one or more requests specify, for each event, a corresponding desired time period over which the one or more resources are to be allocated, and the one or more requests further specify one or more adjustment criteria for defining, for one or more of the events, one or more permissibly adjusted time periods from the desired time period;
   obtaining, for each event, resource availability data indicative of an availability of the one or more resources during the desired time period,
   for each event:
      determining, based on the resource availability data, a viable time period, wherein the viable time period is either the desired time period or a permissibly adjusted time period that satisfies the one or more adjustment criteria; and
      allocating the one or more resources to the viable time period;
   obtaining, for at least one event of the series of recurring events, updated resource availability data indicative of an updated availability of the one or more resources during the viable time period;
   determining, based on the updated resource availability data, an updated viable time period for the at least one event, wherein the updated viable time period is either the desired time period or a permissibly adjusted time period; and
   allocating the one or more resources, for the at least one event, to the updated viable time period;
   wherein determining the updated viable time period comprises:
      determining, based on the updated resource availability data, that at least one of the one or more resources is unavailable at the previous viable time period;
      in response to determining that the at least one of the one or more resources is unavailable at the viable time period, determining, based on the updated resource availability data, that the at least one of the one or more resources is available at one or more other time periods, wherein each of the one or more other time periods is the desired time period or a permissibly adjusted time period; and
      setting the updated viable time period to be one of the one or more other time periods.

* * * * *